United States Patent [19]

Kamimura

[11] 4,281,076
[45] Jul. 28, 1981

[54] THERMOSETTING ACRYLIC RESIN POWDER COATING COMPOSITIONS

[75] Inventor: Masaaki Kamimura, Hiratsuka, Japan

[73] Assignee: Kansai Paint Company, Limited, Japan

[21] Appl. No.: 26,802

[22] Filed: Apr. 3, 1979

[30] Foreign Application Priority Data

Aug. 18, 1978 [JP] Japan ................................ 53-101346
Sep. 27, 1978 [JP] Japan ................................ 53-119783

[51] Int. Cl.$^3$ ...................... C08L 37/00; C08L 75/04
[52] U.S. Cl. .................................. 525/124; 525/208; 525/934; 260/42.28
[58] Field of Search ........................ 525/124, 208, 934

[56] References Cited

U.S. PATENT DOCUMENTS

| | | | |
|---|---|---|---|
| 3,787,521 | 1/1974 | Labana | 525/208 |
| 3,857,818 | 12/1974 | Frizelle | 525/124 |
| 3,914,333 | 10/1975 | Labana | 525/208 |
| 3,919,346 | 11/1975 | Katsimbas | 525/208 |
| 3,919,347 | 11/1975 | Katsimbas | 525/934 |
| 3,959,405 | 5/1976 | Labana | 525/208 |
| 3,976,719 | 8/1976 | Labana | 525/208 |
| 3,993,849 | 11/1976 | Victorius | 525/124 |
| 3,998,905 | 12/1976 | Labana | 525/208 |
| 4,044,070 | 8/1977 | Labana | 525/208 |
| 4,069,275 | 1/1978 | Labana | 525/208 |
| 4,150,211 | 4/1979 | Mullen | 525/124 |
| 4,211,691 | 7/1980 | FitzGerald | 525/208 |

FOREIGN PATENT DOCUMENTS

| | | | |
|---|---|---|---|
| 48-32150 | 10/1973 | Japan . | |
| 49-117530 | 11/1973 | Japan | 525/124 |
| 50-158620 | 6/1974 | Japan | 525/124 |
| 52-3816 | 1/1977 | Japan . | |

Primary Examiner—Paul Lieberman

Attorney, Agent, or Firm—Larson and Taylor

[57] ABSTRACT

The present invention relates to a thermosetting acrylic resin powder coating composition and comprises specified four components (A) to (D), said four components (A) to (D) being:

(A) a mixture of a glycidyl-containing acrylic resin and a hydroxyl-containing acrylic resin, or a glycidyl- and hydroxyl-containing acrylic resin, (B) a blocked isocyanate compound having a melting point of 60° to 140° C. and solid at room temperature, (C) an aliphatic dibasic acid or anhydride thereof, and (D) at least one tin compound represented by the formula $SnO_2$, $R_2SnO$, $R_2SnX_2$, $R_2Sn(OCOR')_2$,

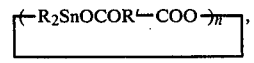

$R_3SnX$, $R_3Sn-O-SnR_3$,

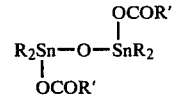

or $R_4Sn$ wherein R is phenyl or alkyl having 1 to 18 carbon atoms, X is halogen, alkoxyl having 1 to 18 carbon atoms or hydroxyl, R' is alkyl or alkenyl having 1 to 18 carbon atoms and n is an integer of 1 to 5.

The coating composition comprising the specified four components (A) to (D) can give coatings which have outstanding surface smoothness even when less that 100μ in thickness.

15 Claims, No Drawings

THERMOSETTING ACRYLIC RESIN POWDER COATING COMPOSITIONS

This invention relates to thermosetting acrylic resin powder coating compositions.

Various powder coating compositions of this type have heretofore been developed. Published Unexamined Japanese Patent Application No. 117530/1974, for example, discloses a powder coating composition comprising 60 to 96% by weight of a glycidyl-containing acrylic resin, 2 to 20% by weight of an aliphatic (or aromatic or alicyclic) dibasic acid and 2 to 20% by weight of a blocked isocyanate compound and, when desired, further containing an organotin compound which is specifically dibutyltin dichloride. Published Unexamined Japanese Patent Application No. 32150/1973 discloses a powder coating composition comprising a hydroxyl-containing acrylic resin, a blocked isocyanate compound and an organotin compound. Furthermore, Published Examined Japanese Patent Application No. 3816/1977 proposes a powder coating composition comprising a glycidyl-containing or a glycidyl- and hydroxyl-containing acrylic resin, an aliphatic dibasic acid (or anhydride thereof) and a triphenyltin compound.

I have made detailed studies on these powder coating compositions already developed and found that none of them are fully satisfactory to use in view of a economy and properties of the coatings prepared therefrom. Stated more specifically these compositions must be applied to a larger thickness than is needed, usually to a thickness of at least 100$\mu$ to obtain smooth-surfaced coating films, consequently necessitating an increased amount of the composition and failing to assure economical use of the material. Moreover the coating films formed on curing are not fully resistant to solvents and are liable to crack, yellow and soften. It is therefore almost impossible to use the coating compositions for applications where the coating film must have a small thickness of less than 100$\mu$, good surface smoothness and high resistance to solvents. For example, they are not usable for coating motor vehicles and household electric appliances.

The main object of the present invention is to provide thermosetting acrylic resin powder coating compositions giving coating films which have outstanding surface smoothness even when less than 100$\mu$ in thickness.

Another object of the present invention is to provide thermosetting acrylic resin powder coating compositions capable of forming coating films having high resistance to solvents.

Another object of the present invention is to provide thermosetting acrylic resin powder coating compositions capable of forming coating films which are free of defects such as cracking, yellowing or softening.

Still another object of the present invention is to provide thermosetting acrylic resin powder coating compositions which are curable at low temperatures.

These objects and features of this invention will become apparent from the following description.

The thermosetting acrylic resin powder coating compositions of the present invention comprise:

(A) a mixture of a glycidyl-containing acrylic resin and a hydroxyl-containing acrylic resin, or a glycidyl- and hydroxyl-containing acrylic resin, (B) a blocked isocyanate compound having a melting point of 60° to 140° C. and solid at room temperature, (C) an aliphatic dibasic acid or anhydride thereof, and (D) at least one tin compound represented by the formula $SnO_2$, $R_2SnO$, $R_2SnX_2$, $R_2Sn(OCOR')_2$,

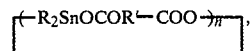

$R_3SnX$, $R_3Sn$-$O$-$SnR_3$,

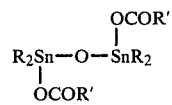

or $R_4Sn$ wherein R is phenyl or alkyl having 1 to 18 carbon atoms, X is halogen, alkoxyl having 1 to 18 carbon atoms or hydroxyl, R' is alkyl or alkenyl having 1 to 18 carbon atoms and n is an integer of 1 to 5, each of the acrylic resins having a glass transition temperature of 50° to 90° C. and a weight average molecular weight of 5000 to 20000.

My research has revealed that the foregoing objects can be fully fulfilled when the specified four kinds of substances, namely the acrylic resin or acrylic resin mixture (A), the blocked isocyanate compound (B), the aliphatic dibasic acid or anhydride thereof (C) and the tin compound (D), are conjointly used, and that especially in specified proportions. The objects are not attainable if any one of the four substances is absent.

The component (A) includes a mixture of a glycidyl-containing acrylic resin and a hydroxyl-containing acrylic resin, and a glycidyl- and hydroxyl-containing acrylic resin.

The glycidyl-containing acrylic resin, hydroxyl-containing acrylic resin and glycidyl- and hydroxyl-containing acrylic resin useful as the component (A) have the following compositions. The glycidyl-containing acrylic resin comprises (i) 15 to 40% by weight of a glycidyl-containing vinyl monomer and/or methyl-glycidyl-containing vinyl monomer, (ii) 10 to 85% by weight of an acrylate and/or methacrylate and (iii) 0 to 50% by weight of other vinyl monomer. The hydroxyl-containing acrylic resin comprises (i) 5 to 40% by weight of a hydroxyl-containing vinyl monomer, (ii) 10 to 95% by weight of an acrylate and/or methacrylate and (iii) 0 to 50% by weight of other vinyl monomer. The glycidyl- and hydroxyl-containing acrylic resin comprises (i) 15 to 30% by weight of a glycidyl-containing vinyl monomer and/or methyl-glycidyl-containing vinyl monomer, (ii) 5 to 20% by weight of a hydroxyl-containing vinyl monomer, (iii) 10 to 80% by weight of an acrylate and/or methacrylate and (iv) 0 to 40% by weight of other vinyl monomer. Each of these three kinds of acrylic resins has a glass transition temperature of 50° to 90° C. and a weight average molecular weight of 5000 to 20000.

Examples of useful glycidyl-containing vinyl monomer and methylglycidyl-containing vinyl monomers for composing the acrylic resins are glycidyl acrylate, glycidyl methacrylate, methylglycidyl acrylate and methylglycidyl methacrylate. These monomers are usable singly, or at least two of them are usable in admixture. Of those monomers glycidyl methacrylate and methylglycidyl methacrylate are preferable. For the preparation of the glycidyl- and hydroxyl-containing acrylic resin, the monomers are used in an amount of 15 to 30% by weight, preferably 17 to 25% by weight, of the acrylic resin. For the preparation of the glycidyl-containing acrylic resin, these monomers are used in an amount of 15 to 40% by weight, preferably 20 to 35% by weight, of the acrylic resin. If the monomers are used in lesser amounts than the specified, the resulting composition will not be satisfactorily curable at low temperatures, giving coating films which are inferior in physical properties and resistance to solvents, whereas larger amounts than the specified will impart reduced surface smoothness to the coating film.

Examples of useful hydroxyl-containing vinyl monomers are 2-hydroxyethyl acrylate, hydroxypropyl acrylate, 2-hydroxyethyl methacrylate, hydroxypropyl methacrylate, etc. A reaction product of 1 mol of acrylic or methacrylic acid and 1 mol of polyhydric alcohol is also usable as the hydroxyl-containing monomer. Examples of the polyhydric alcohol are trimethyleneglycol, tetramethyleneglycol, hexamethyleneglycol, diethyleneglycol, triethyleneglycol, propyleneglycol, neopentylglycol, 1.2-, 1.3-, 2.3- or 1.4-buthyleneglycol, 1.6- or 2.5-hexanediol. Of those monomers, 2-hydroxyethylacrylate, 2-hydroxyethylmethacrylate, hydroxypropylacrylate and hydroxypropylmethacrylate are preferred. For the preparation of the glycidyl- and hydroxyl-containing acrylic resins, the hydroxyl-containing vinyl monomers are used in an amount of 5 to 20% by weight, preferably 7 to 18% by weight, more preferably 7 to 15% by weight, of the acrylic resin. For the preparation of the hydroxyl-containing acrylic resin, these monomers are used in an amount of 5 to 40% by weight, preferably 10 to 35% by weight, of the acrylic resin. If the hydroxyl-containing vinyl monomers are used in amounts smaller than the specified, the coating film prepared from the resulting composition will have lower resistance to solvents and reduced surface smoothness, whereas the use of larger amounts afford coating films which are inferior in surface smoothness and corrosion resistance.

Exemplary of useful acrylates and methacrylates are esters of acrylic or methacrylic acid and monohydric alcohols having 1 to 18 carbon atoms, such as methyl acrylate, methyl methacrylate, ethyl acrylate, ethyl methacrylate, n- or iso-butyl acrylate, n- or iso-butyl methacrylate, n- or iso-propyl acrylate, n- or iso-propylmethacrylate, n-, iso-, sec- or tert-pentyl acrylate, n-, iso-, sec- or tert-pentyl methacrylate, hexyl acrylate, hexyl methacrylate, cyclohexyl acrylate, cyclohexyl methacrylate, 2-ethythexyl acrylate, 2-ethylhexyl methacrylate, heptyl acrylate, heptyl methacrylate, octyl acrylate, octyl methacrylate, 2-octyl acrylate, 2-octyl methacrylate, nonyl acrylate, nonyl methacrylate, decyl acrylate, decyl methacrylate, dodecyl acrylate, dodecyl methacrylate, tetradecyl acrylate, tetradecyl methacrylate, hexadecyl acrylate, hexadecyl methacrylate and lauryl methacrylate. These esters are usable singly, or at least two of them are usable in admixture. For the preparation of the glycidyl- and hydroxyl-containing acrylic resin, these esters are used in an amount of 10 to 80% by weight, preferably 20 to 76% by weight, of the acrylic resin. For the preparation of the glycidyl-containing acrylic resins, these esters are used in an amount of 10 to 85% by weight, preferably 35 to 80% by weight, of the acrylic resin. For the preparation of the hydroxyl-containing acrylic resins, these esters are used in an amount of 10 to 95% by weight, preferably 40 to 90% by weight, of the acrylic resin. If the esters are used in smaller amounts than the specified, the coating film prepared from the resulting composition will have impaired weathering durability and is likely to become colored, whereas if the use of larger amounts afford coating films which are not satisfactorily curable at low temperatures and gives coating films of reduced resistance to solvents.

Examples of other useful vinyl monomers are styrene, vinyltoluene, α-methyl styrene, vinyl chloride, vinyl isobuthylether, methyl vinylether, 2-ethylhexyl vinylether and vinyl acetate. Up to 50% by weight, preferably 0 to 40% by weight, of such other monomers are used based on the resin. Up to 40% by weight of such other monomers are used based on the glycidyl- and hydroxyl-containing acrylic resin. When these other vinyl monomers are used in larger amounts, the resulting coating films will have impaired resistance to weather, thermal discoloration, moisture and contamination.

Three kinds of these acrylic resins useful in this invention can be prepared by usual solution polymerization, emulsion polymerization, suspension polymerization or like suitable process from the monomers selected as the foregoing components. Each of the three acrylic resins of this invention has a glass transition temperature of 50° to 90° C., preferably 50° to 85° C., as calculated from the equation of Fox. If the glass transition temperature is lower than 50° C., the resin gives compositions of poor anti-blocking properties, whereas if it is higher than 90° C., the coating films formed will come to undesirable surface smoothness. The acrylic resins should have a weight average molecular weight of 5000 to 20000, preferably 8000 to 16000. If resins of smaller molecular weight are used, the resulting composition has poor antiblocking properties and is less amenable to curing at low temperatures, giving coating films of poor physical properties. If the molecular weight exceeds 20000, the coating films will come to undesirable surface smoothness.

The blocked isocyanate compounds useful as the component B are in a solid state at room temperature and have a melting point of 60° to 140° C., preferably 70 to 125° C. With use of blocked isocyanate compounds melting at a temperature of lower than 60° C., the coating composition has poor anti-blocking properties, whereas if the melting point is higher than 140° C., coating films of reduced surface smoothness will result. Blocked isocyanate compounds to be used in the present invention are those free isocyanate groups of which are blocked with a blocking agent. Examples of useful polyisocyanate compounds are isophorone diiosocyanate, hexamethylene diisocyanate, hydrogenated diphenylmethane diisocyanate, hydrogenated xylilene diisocyanate, tetramethylene diisocyanate, lysine diisocyanate, trimethylhexamethylene diisocyanate, cyclohexane diisocyanate, desmodur L.N (product of BAYER), and like diisocyanates. Also useful are polyisocyanate compounds produced by reacting a polyhydric alcohol such as ethylene glycol, diethylene glycol, propylene glycol, hexamethylene glycol, glycerin or trimethylolpropane with such a diisocyanate in the ratio of up to 0.3 mole of the former per mole of the latter or by reacting up to 0.5 mole of bisphenol A with 1 mole of the diisocyanate to obtain an adduct. Example of useful blocking agent are such as p-t-octylphenol, p-hydroxybiphenyl, butyl p-hydroxybenzoate, bisphenol, A, ε- caprolactam, thymol, oxime, methyl cellosolve phenol, cresol, p-oxybenzoate, acetylacetone, acetone oxide or cyclohexanol so as to eliminate free isocyanate groups. These blocked isocyanate compounds are used singly, or at least two of them are usable in admixture.

The aliphatic dibasic acids and anhydride thereof useful as the component (C) are succinic acid, succinic anhydride, glutaric acid, adipic acid, pimelic acid, azelaic acid, sebacic acid, decamethylenedicarboxylic acid, brassylic acid (undecamethylenedicarboxylic acid), eicosandioic acid, maleic anhydride, citrasonic acid, citraconic anhydride, docosanedioic acid, sebacic polyanhydride, decamethylenedicarboxylic polyanhydride and like saturated or unsaturated aliphatic dibasic acids having at least two carbon atoms and anhydrides thereof. These aliphatic dibasic acid and anhydride are used singly, or at least two of them are usable in admixture. Among these examples, decamethylenedicarboxylic acid, brassylic acid, docosane dioic acid, sebacic acid and polyanhydrides of these acids are especially suitable for providing the desired coating properties.

The tin compounds useful in the present invention for the component (D) are represented by the formula $SnO_2$, $R_2SnO$, $R_2SnX_2$, $R_2Sn(OCOR')_2$,

$R_3SnX$, $R_3Sn-O-SnR_3$,

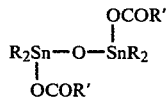

or $R_4Sn$ wherein R is phenyl or alkyl having 1 to 18 carbon atoms, X is halogen, alkoxyl having 1 to 18 carbon atoms or hydroxyl, R' is alkyl or alkenyl having 1 to 18 carbon atoms, and n is an integer of 1 to 5. These compounds are used singly, or at least two of them are usable in combination. Examples of such compounds are tin dioxide, diphenyltin oxide, dibutyltin oxide, diphenyltin dichloride, diphenyltin dibutoxide, diphenyltin dihydroxide, dibutyltin dichloride, dioctyltin dichloride, dibutyltin dibutoxide, dibutyltin dihydroxide, diphenyltin diacetate, dibutyltin diacetate, diphenyltin succinate polymer (n=1 to 3), diphenyltin maleate polymer (n=2 to 5), dibutyltin succinate polymer (n=1 to 3), dibutyltin maleate polymer (n=2 to 5), triphenyltin chloride, triphenyltin oxide, triphenyltin fluoride, triphenyltin butoxide, triphenyltin hydroxide, bis(tributyltin)oxide, tributyltin chloride, tributyltin butoxide, tributyltin hydroxide, bis(triphenyltin)oxide, bistributyltin oxide, bis(diphenyltin acetate)oxide, tetraphenyltin, tetrabutyltin, dibutyltin diphenyl, etc. These tin compound are used singly, or at least two of them are usesable in admixture. Preferable examples are bis(diphenyltin acetate)oxide, tributyltin hydroxide, diphenyltin maleate polymer, triphenyltin chloride, diphenyltin oxide, dibutyltin diacetate, tin dioxide, bis(tributyltin)oxide, diphenyltin diacetate, dibutyltin maleacte polymer.

The powder coating compositions of this invention comprise the components (A), (B), (C) and (D).

The component (A) includes a mixture of a glycidyl-containing acrylic resin and a hydroxyl-containing acrylic resin, and a glycidyl- and hydroxyl-containing acrylic resin. The proportions of the components (A) to (D) varys with the kind of the component (A). In the case wherein the glycidyl- and hydroxyl-containing acrylic resin is used as the component (A), these components are used in the ratio of 45 to 75% by weight, preferably 50 to 70% by weight, of the component (A), 22 to 40% by weight, preferably 25 to 35% by weight, of the component (B), 3 to 12% by weight, preferably 3 to 7% by weight, of the component (C) and 0.4 to 4% by weight, preferably 0.5 to 3% by weight, of the component (D). With less than 45% by weight of the component (A) used, the coating film formed has reduced flexibility and lower surface smoothness, whereas when the amount of the component (A) exceeds 75% by weight, the composition is not satisfactorily curable at low temperatures. If the proportion of the component (B) is less than 22% by weight, the coating film has reduced surface smoothness, whereas if it is more than 40% by weight, the coating film yellows and becomes less resistant to weather. When the amount of the component (C) is below 3% by weight, the coating film has lower curability, while if it is above 12% by weight, the coating composition has lower anti-blocking properties, giving coating film of poor surface smoothness. When the amount of the component (D) is less than 0.4% by weight, the composition has reduced curability at low temperatures, whereas when it is larger than 4% by weight, the resulting coating film is prone to yellowing and has reduced surface smoothness. Thus, the objects of the invention are not achievable when the components are used in amounts other than those specified.

In the case wherein the mixture of the glycidyl-containing acrylic resin and the hydroxyl-containing acrylic resin is used as the component (A), these components are used in the ratio of 45 to 80% by weight, preferably 50 to 75% by weight, of the component (A), 20 to 40% by weight, preferably 22 to 38% by weight, of the component (B), 3 to 20% by weight, preferably 3 to 15% by weight, of the component (C) and 0.1 to 5% by weight, preferably 0.5 to 4% by weight, of the component (D). With less than 45% by weight of the component (A) used, the coating film formed has reduced flexibility and lower surface smoothness, whereas when the amount of the component (A) exceeds 80% by weight, the composition is not satisfactorily curable at low temperatures. If the proportion of the component (B) is less than 20% by weight, the coating film has reduced surface smoothness, whereas if it is more than 40% by weight, the coating film yellows and becomes less resistant to weather. When the amount of the component (C) is below 3% by weight, the coating film has lower curability, while if it is above 20% by weight, the coating composition has lower anti-blocking properties, giving coating films of poor surface smoothness. When the amount of the component (D) is less than 0.1% by weight, the composition has reduced curability at low temperatures, whereas when it is larger than 5% by weight, the resulting coating film is prone to yellowing and has reduced surface smoothness. Thus, the objects of the invention are not achievable when the components are used in amounts other than those specified.

The mixture of the glycidyl-containing acrylic resin and the hydroxyl-containing acrylic resin is prepared by mixing 10 to 90% by weight, preferably 20 to 80% by weight of the former with 90 to 10% by weight, preferably 80 to 20% by weight of the latter. With less than 10% by weight of the glycidyl-containing acrylic resin, the coating composition is not satisfactorily curable at low temperature, whereas when the amount of the glycidyl-containing acrylic resin exceeds 90% by weight, the coating film formed has reduced resistance to gasoline and lower surface smoothness. When the mixture of the glycidyl-containing acrylic resin and the hydroxyl-containing acrylic resin is used in the present invention, it is preferable to admix them in so proportions that the resulting mixture will contain 3 to 30% by weight, preferably 6 to 25% by weight, of a glycidyl- and/or methylglycidyl-containing vinyl monomer and 3 to 30% by weight, preferably 4 to 25% by weight, of a hydroxyl-containing vinyl monomer.

The coating composition of this invention can further incorporate therein an epoxy resin when it is desired to impart improved adhesion. Epoxy resins useful in this invention are those having at least two epoxy groups per molecule, an epoxy equivalent of up to 2500, preferably up to 350 and a number average molecular weight of up to 3000, preferably up to 500. Examples of useful epoxy resins are Epon 828, 834, 864, 1001, 1004 (trade mark, product of Shell Chemical Co. Ltd.) An amount of the epoxy resin used in the present invention varys with a kind of the component (A). With use of the glycidyl- and hydroxyl-containing acrylic resin, the epoxy resin may be used in an amount of not more than 5 parts by weight, preferably 0.3 to 4.0 parts by weight, per 100 parts by weight of the combined amount of the components (A) to (D). On the other hand, when the mixture of the glycidyl-containing acrylic resin and the hydroxyl-containing acrylic resin is used, the amount of the epoxy resin may be not more than 10 parts by weight, preferably 0.3 to 6 parts by weight, per 100 parts by weight of the components (A) to (D). If the epoxy resins are used in larger amounts than the specified, the coating film will have lower weather resistance, hence objectionable.

In order to permit the present coating compositions to form coatings of improved surface smoothness, the composition can further contain a salt of lead or zinc in an amount of up to 2 parts by weight per 100 parts by weight of the combined amount of the components (A) to (D). Examples of useful lead and zinc salts are lead acetate, lead naphthenate, zinc naphthenate and zinc chloride. The coating compositions in this invention may further incorporate a pigment, leveling agent, antipopping agent and other additive. Pigments include extender pigments, colouring pigments and metal powder pigments. Examples of leveling agents are acrylic oligomers having no functional group. Examples of anti-popping agents are benzoine and benzoine alkylether.

The powder coating composition of this invention can be prepared from a mixture of the above ingredients in a specified ratio by thoroughly melting and kneading the mixture at about 80° to about 130° C. and pulverizing the mixture on cooling. Heating rolls, heating kneaders, extruders and other usual devices are useful for melting and kneading the mixture. Alternatively the powder coating composition can be produced by dissolving the ingredients in a volatile solvent and subjecting the solution to the so-called spray-drying method in which the solution is sprayed in hot air.

The powder coating compositions of this invention can be applied to the article to be coated by the powder electrostatic coating process, fluidized bed coating process and the like. The articles to which the present compositions are applicable include, for example, the bodies, wheels and interior parts of motor vehicles, household electric appliances such as refrigerators, washing machines, air-conditioning units, illuminating devices and the like, steel furnature, building materials, traffic installations such as guard rails, street lamps, traffic signs and the like, glass products, etc.

The present compositions, when applied to articles, can be cured at a lower temperature than the conventional powder coating compositions, for example at 140° to 160° C. for about 30 minutes. When it is desired to cure the present compositions at a high temperature of 180° to 200° C., they can be cured in about 5 to about 10 minutes.

The coating film obtained on curing have outstanding surface smoothness and exceedingly high resistance to solvents even when up to $100\mu$ in thickness, for example, as thin as 30 to $60\mu$. Such properties have never been afforded by the conventional acrylic resin powder coating compositions. Except these properties, the powder coating compositions of this invention are also outstanding, for example, in storage stability (anti-blocking properties) and the properties (hardness, physical properties, chemical properties, durability, etc.) of the coatings prepared therefrom.

Reference Examples, Examples and Comparison Examples are given below to describe the present invention in greater detail. The percentages and parts in these examples are all by weight unless otherwise specified.

REFERENCE EXAMPLE

A 1600 g quantity of toluene is placed into a flask equipped with a dropping funnel, reflux condenser, stirrer and thermometer. After the toluene has started reflux with heating, 1600 g of a mixture of the polymerizable monomers and polymerization initiator listed in Table 1 are added dropwise to the toluene over a period of about 2 hours. After the completion of the dropwise addition of the mixture, the resulting mixture is refluxed for a further 3 hours. The reflux is then discontinued, and the toluene distilled off from the flask. When the temperature of the reaction mixture in the flask has dropped to 150° to 180° C., the remaining toluene is distilled off in a vacuum to obtain an acrylic resin. Table 1 shows the glass transition temperature and the weight average molecular weight of each acrylic resin thus prepared.

TABLE 1

| Monomer (part) | Acrylic resin | | | | | | | | | | |
|---|---|---|---|---|---|---|---|---|---|---|---|
|  | (A) | (B) | (C) | (D) | (E) | (F) | (G) | (H) | (I) | (J) | (K) |
| Glycidyl methacrylate | 20 |  | 24 | 20 | 25 | 13 | 33 | 20 | 20 | 20 | 20 |
| Methyl glycidyl methacrylate |  | 17 |  |  |  |  |  |  |  |  |  |
| 2-Hydroxyethyl acrylate |  |  | 2 |  |  |  |  |  |  |  |  |
| 2-Hydroxyethyl methacrylate | 7 | 13 |  | 10 | 15 | 10 | 10 | 3 | 23 | 10 | 10 |
| 2-Hydroxypropyl methacrylate |  |  | 5 |  |  |  |  |  |  |  |  |

TABLE 1-continued

| | | | | | | | | | | | |
|---|---|---|---|---|---|---|---|---|---|---|---|
| Methyl methacrylate | 48 | 60 | 49 | 50 | 20 | 57 | 37 | 57 | 37 | 50 | 50 |
| 2-Ethylhexyl acrylate | 5 | 10 | | | | | | | | | |
| Lauryl methacrylate | | | | | 5 | | | | | | |
| n-Butyl methacrylate | | | | | 10 | | | | | | |
| Styrene | 20 | | 20 | 20 | 25 | 20 | 20 | 20 | 20 | 20 | 20 |
| Azobisisobutylonitrile | 4 | 3.5 | 4.5 | 4 | 4 | 4 | 4 | 4 | 4 | 7*1 | 2 |
| Glass-transition temperature (°C.) | 75 | 61 | 78 | 85 | 62 | 89 | 77 | 89 | 78 | 85 | 85 |
| Weight average molecular weight | 11000 | 14000 | 9000 | 11000 | 11000 | 11000 | 11000 | 11000 | 11000 | 4000 | 25000 |

| Monomer (part) | Acrylic resin | | | | | | | | |
|---|---|---|---|---|---|---|---|---|---|
| | (M) | (N) | (O) | (P) | (Q) | (R) | (S) | (T) | (U) |
| Glycidyl methacrylate | 30 | 10 | 20 | 34 | | | | | 20 |
| Methyl glycidyl methacrylate | | 10 | 15 | | | | | | |
| 2-Hydroxyethyl acrylate | | | | | | | 5 | | |
| 2-Hydroxyethyl methacrylate | | | | | 30 | 10 | | 35 | 10 |
| 2-Hydroxypropyl methacrylate | | | | | | | | 25 | |
| Methyl methacrylate | 30 | 50 | 40 | 36 | 30 | 35 | 55 | 20 | 50 |
| 2-Ethylhexyl acrylate | | 5 | | | | | | 5 | |
| Lauryl methacrylate | 5 | 5 | | | 5 | | | | |
| n-Butyl methacrylate | 15 | | 25 | | 15 | 30 | 10 | 20 | |
| Styrene | 20 | 20 | | 30 | 20 | 20 | | 30 | 20 |
| Azobisisobutylonitrile | 5 | 5 | 2.5 | 6*1 | 5 | 5 | 4 | 3 | 4 |
| Glass-transition temperature (°C.) | 68 | 66 | 57 | 81 | 71 | 69 | 80 | 59 | 85 |
| Weight average molecular weight | 10000 | 10000 | 13000 | 8500 | 10500 | 10500 | 9000 | 12500 | 11000 |

*1 containing 2 parts of lauryl mercaptan

EXAMPLE

The acrylic resin prepared in Reference Example is mixed with the blocked isocyanate compound, aliphatic dibasic acid and tin compound specified in Table 2 in the proportions shown in Table 2 and then melted by heating rolls at 90° C. for 10 minutes. After cooling, the melted product is pulverized to produce a powder coating composition having a particle size of 20μ to 70μ.

A steel plate having a thickness of 0.8 mm is chemically treated with zinc phosphate and then coated with an electro-depositing coating composition ("Electron No. 7200", product of Kansai Paint CO. Ltd.) by heating at 170° C. for 30 minutes. Then the plate is coated with the above powder coating composition and baked at 160° C. for 20 minutes. Properties of the plate thus obtained are determined by the following method and results obtained are shown in Table 3.

TABLE 2

| | | Example | | | | | | | Comparison Example | | | | | | |
|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 |
| Acrylic resin(*1) | (1) | (A) | (B) | (C) | (D) | (E) | (D) | (D) | (F) | (G) | (H) | (I) | (J) | (K) | (D) |
| | (2) | 60 | 55 | 60 | 65 | 70 | 65 | 65 | 65 | 65 | 65 | 65 | 65 | 65 | 70 |
| Blocked isocyanate compound(*2) | (1) | (A) | (C) | (D) | (B) | (B) | (A) | (B) | (B) | (B) | (B) | (B) | (B) | (B) | (B) |
| | (2) | 33 | 35 | 35 | 30 | 26.5 | 27 | 30 | 30 | 30 | 30 | 30 | 30 | 30 | 20 |
| Aliphatic dibasic acid(*3) | (1) | (a) | (b) | (b) | (a) | (b) | (a) | (c) | (a) | (a) | (a) | (a) | (a) | (a) | (a) |
| | (2) | 5 | 7 | 3 | 4 | 3 | 6 | 4 | 4 | 4 | 4 | 4 | 4 | 4 | 7 |
| Tin compound(*4) | (1) | A' | B' | C' | D' | E' | F' | D' | D' | D' | D' | D' | D' | D' | D' |
| | (2) | 2 | 3 | 2 | 1 | 0.5 | 2 | 1 | 1 | 1 | 1 | 1 | 1 | 1 | 3 |
| Epoxy resin(*5) | (1) | | | Epon 834 | | | Epon 1004 | | | | | | | | | |
| | (2) | | | 1 | | | 3 | | | | | | | | | |
| Titan dioxide(*6) | (2) | 30 | 30 | 30 | 30 | 30 | 30 | 30 | 30 | 30 | 30 | 30 | 30 | 30 | 30 |
| Other material | | | (*8) | | | | | | | | | | | | | |
| Lead naphthenate | (2) | 0.5 | 1.0 | 0 | 0 | 0 | 0 | 0 | 0 | 0 | 0 | 0 | | | |
| Leveling agent(*7) | (2) | 0.5 | 0.5 | 0.5 | 0.5 | 0.5 | 0.5 | 0.5 | 0.5 | 0.5 | 0.5 | 0.5 | 0.5 | 0.5 | 0.5 |

| | | Example | | | | | | | | | Comparison Example | | | | |
|---|---|---|---|---|---|---|---|---|---|---|---|---|---|---|---|
| | | 8 | | 9 | | 10 | | 11 | | 12 | | 8 | 9 | 10 | 11 | 12 |
| Acrylic resin(*1) | (1) | (M) | (Q) | (M) | (Q) | (M) | (Q) | (M) | (Q) | (M) | (Q) | (D) | (D) | (D) | (D) | (D) |
| | (2) | 46.5 | 15.5 | 31 | 31 | 15.5 | 46.5 | 31.5 | 31.5 | 30 | 30 | 53 | 65.9 | 61 | 67 | 54 |
| Blocked isocyanate compound(*2) | (1) | (A) | | (A) | | (A) | | (B) | | (C) | | (B) | (B) | (B) | (B) | (B) |
| | (2) | 30 | | 30 | | 30 | | 25 | | 35 | | 42 | 30 | 30 | 30 | 30 |
| Aliphatic dibasic acid(*3) | (1) | (a) | | (a) | | (a) | | (b) | | (a) | | (a) | (a) | (a) | (a) | (a) |
| | (2) | 6 | | 7 | | 5 | | 10 | | 3 | | 4 | 4 | 4 | 2 | 15 |
| Tin compound(*4) | (1) | A' | | A' | | A' | | E' | | G' | | D' | D' | D' | D' | D' |
| | (2) | 2 | | 1 | | 3 | | 2 | | 2 | | 1 | 0.1 | 5 | 1 | 1 |
| Epoxy resin(*5) | (1) | | | | | Epon 834 | | | | | | | | | | |
| | (2) | | | | | 1 | | | | | | | | | | |

4,281,076

TABLE 2-continued

| | | | | | | | | | | | |
|---|---|---|---|---|---|---|---|---|---|---|---|
| Titan dioxide(*6) | (2) | 30 | 30 | 30 | 30 | 30 | 30 | 30 | 30 | 30 | 30 |
| Other material | | | | | | | | | | | |
| Lead naphthenate | (2) | 0 | 0 | 0 | 0 | 1.0(*9) | | | | | |
| Leveling agent(*7) | (2) | 0.5 | 0.5 | 0.5 | 0.5 | 0.5 | 0.5 | 0.5 | 0.5 | 0.5 | 0.5 |

| | | Example | | | | | | | | Comparison Example | | | | | | | | | |
|---|---|---|---|---|---|---|---|---|---|---|---|---|---|---|---|---|---|---|---|
| | | 13 | | 14 | | 15 | | 16 | | 13 | 14 | 15 | 16 | | 17 | | 18 | |
| Acrylic resin(*1) | (1) | (O) | (S) | (P) | (T) | (N) | (Q) | (M) | (R) | (D) | (D) | (D) | (M) | (Q) | (M) | (Q) | | |
| | (2) | 32 | 32 | 14.2 | 56.8 | 42 | 28 | 35.7 | 15.3 | 65 | 65 | 87 | 62 | 62 | 35 | 40 | | |
| Blocked isocyanate compound(*2) | (1) | (D) | | (B) | | (B) | | (C) | | (B) | (B) | | (A) | | (A) | | (A) | |
| | (2) | 30 | | 22 | | 22 | | 35 | | 30 | 35 | | 30 | | 30 | | 13 | |
| Aliphatic dibasic acid(*3) | (1) | (c) | | (a) | | (a) | | sebasic acid | | (a) | | (a) | (a) | | (a) | | (b) | |
| | (2) | 4 | | 6 | | 7 | | 10 | | 4 | | 12 | 7 | | 7 | | 10 | |
| Tin compound(*4) | (1) | B' | | H' | | I' | | D' | | D' | D' | D' | A' | | A' | | E' | |
| | (2) | 2 | | 1 | | 1 | | 4 | | 1 | 1 | 1 | 1 | | 1 | | 2 | |
| Epoxy resin(*5) | (1) | | | | | | | Epon 1004 | | Epon 834 | | | | | | | | |
| | (2) | | | | | | | 5 | | 7 | | | | | | | | |
| Titan dioxide(*6) | (2) | 30 | | 30 | | 30 | | 30 | | 30 | 30 | | 30 | | 30 | | 30 | |
| Other material | | | | | | | | | | | | | | | | | | |
| Lead naphthenate | (2) | 0 | | 1.0 | | 1.0 | | 0 | | | | | 0 | | 0 | | 0 | |
| Leveling agent(*7) | (2) | 0.5 | | 0.5 | | 0.5 | | 0.5 | | 0.5 | 0.5 | 0.5 | 0.5 | | 0.5 | | 0.5 | |

| | | Comparison Example | | | | | | | | | | | | | | | | | |
|---|---|---|---|---|---|---|---|---|---|---|---|---|---|---|---|---|---|---|---|
| | | 19 | | 20 | | 21 | | 22 | | 23 | | 24 | | 25 | | 26 | | 27 | |
| Acrylic resin(*1) | (1) | (P) | (T) | (M) | (Q) | (M) | (Q) | (M) | (Q) | (M) | (Q) | (M) | (Q) | (M) | (Q) | (Q) | | (U) | |
| | (2) | 10 | 40 | 31 | 31 | 25.5 | 25.5 | 31.5 | 31.5 | 14.5 | 43.5 | 37.5 | 37.5 | 31.5 | 31.5 | 75 | | 85 | |
| Blocked isocyanate compound(*2) | (1) | (B) | | (C) | | (B) | | (A) | | (A) | | | | (C) | | (A) | | | |
| | (2) | 43 | | 35 | | 25 | | 30 | | 30 | | | | 35 | | 20 | | | |
| Aliphatic dibasic acid(*3) | (1) | (a) | | adipic acid | | (b) | | (a) | | (a) | | (b) | | | | | | (a) | |
| | (2) | 6 | | 1 | | 22 | | 7 | | 5 | | 20 | | | | | | 10 | |
| Tin compound(*4) | (1) | H' | | G' | | E' | | | | A' | | E' | | G' | | A' | | D' | |
| | (2) | 1 | | 2 | | 2 | | | | 7 | | 5 | | 2 | | 5 | | 5 | |
| Epoxy resin(*5) | (1) | | | | | | | | | Epon 834 | | | | | | | | | |
| | (2) | | | | | | | | | 1 | | | | | | | | | |
| Titan dioxide(*6) | (2) | 30 | | 30 | | 30 | | 30 | | 30 | | 30 | | 30 | | | | 30 | |
| Other material | | | | | | | | | | | | | | | | | | | |
| Lead naphthenate | (2) | 1.0 | | 1.0(*10) | | | | 0 | | 0 | | 0 | | 1.0(*11) | | 0 | | 0 | |
| Leveling agent(*7) | (2) | 0.5 | | 0.5 | | 0.5 | | 0.5 | | 0.5 | | 0.5 | | 0.5 | | 0.5 | | 0.5 | |

Notes to Table 2
(1) kind
(2) Amount (part)
(*1)The designations of the acrylic resins correspond to those of the resins prepared in Reference Example.
(*2)The blocked isocyanate compounds (A) to (D) have the following compositions:
(A) An adduct of 1 mole of hydrogenated diphenylmethane diisocyanate and 0.1 mole of bisphenol A, blocked with p-t-octylphenol (m.p. 101° C.).
(B) An adduct of 1 mole of isophorone diisocyanate and 0.1 mole of trimethylolpropane, blocked with ε-caprolactam (m.p. 80° C.).
(C) An adduct of 1 mole of hydrogenated xylilene diisocyanate and 0.1 mole of trimethylolpropane, blocked with p-hydroxybiphenyl (m.p. 95° C.).
(D) Hexamethylene diisocyanate blocked with thymol (m.p. 75° C.).
(*3)Aliphatic dibasic acid
(a) decamethylenedicarboxylic acid
(b) brassylic acid
(c) decosandioic acid (eicosan dicarboxylic acid)
(*4)Tin Compound
A' bis(diphenyltin acetate)oxide
B' tributyltin hydroxide
C' diphenyltin maleate polymer (mixture of n = 3 to 5)
D' triphenyltin chloride
E' diphenyltin oxide
F' dibutyltin diacetate
G' tin dioxide
H' diphenyltin diacetate
I' dibutyltin maleate polymer (mixture of n = 3 to 5)
(*5)The names given in the column for the names of epoxy resins are trade marks of Shell Chemical Co.
(*6)TITANIUM RN57P, product of Titan Gesellschaft A.G.
(*7)Moda flow, product of Monsant Chemical Co., U.S.A.
(*8)Zinc naphthenate
(*9)Zinc naphthenate
(*10)Zinc naphthenate
(*11)Zinc naphthenate

TABLE 3

| Properties | Example | | | | | | | | Comparison Example | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| Anti-blocking property | A | A | A | A | A | A | A | A | A | A | A | A | C | A | A | A |
| Curability at low temperature | A | A | A | A | A | A | A | A | C | A | B | A | C | B | C | B |
| Erichsen test (mm) | 7< | 7< | 7< | 7< | 7< | 7< | 7< | 7< | 0.5 | 5 | 1 | 5 | 0.5 | 5 | 0.5 | 5 |
| Adhesion | 100 | 100 | 100 | 100 | 100 | 100 | 100 | 100 | 80 | 95 | 85 | 95 | 80 | 95 | 80 | 95 |

TABLE 3-continued

| Properties | | | | | | | | | | | | | | | | |
|---|---|---|---|---|---|---|---|---|---|---|---|---|---|---|---|---|
| Surface smoothness (μ) | 50 | 50 | 50 | 50 | 50 | 50 | 50 | 50 | 50 | 150 | 140 | 130 | 45 | 170 | 100 | 50 |
| Resistance to gasoline | 2H | H | 2H | 2H | H | H | 2H | 2H | <6B | 2B | <6B | 2H | <6B | 2H | <6B | 5B |
| Resistance to moisture | A 100 | A 100 | A 100 | A 100 | A 100 | A 100 | A 100 | A 100 | C 70 | B 75 | C 70 | C 75 | C 70 | A 75 | C 70 | A 80 |
| Corrosion resistance (mm) | 1 | 1 | 0.5 | 1 | 1 | 0.5 | 1 | 1> | 3 | 8 | 1 | 10 | 3 | 1 | 2 | 8 |
| Weathering durability (%) | A 93 | A 92 | A 93 | A 93 | A 94 | A 92 | A 93 | A 92 | C 60 | B 75 | C 60 | A 85 | A 65 | A 90 | C 65 | C 60 |
| Heating durability | A | A | A | A | A | A | A | A | A | A | A | A | A | A | B | C |

| | Example | | | | | | | | Comparison Example | | | | | | | |
|---|---|---|---|---|---|---|---|---|---|---|---|---|---|---|---|---|
| Properties | 9 | 10 | 11 | 12 | 13 | 14 | 15 | 16 | 9 | 10 | 11 | 12 | 13 | 14 | 15 | 16 |
| Anti-blocking property | A | A | A | A | A | A | A | A | A | A | A | C | C | A | A | A |
| Curability at low temperature | A | A | A | A | A | A | A | A | C | B | C | B | B | A | A | B |
| Erichsen test (mm) | 7< | 7< | 7< | 7< | 7< | 7< | 7 | 7 | 0.5 | 3 | 0.5 | 5 | 4 | 7 | 5 | 3 |
| Adhesion | 100 | 100 | 100 | 100 | 100 | 100 | 100 | 100 | 80 | 95 | 85 | 95 | 95 | 95 | 95 | 85 |
| Surface smoothness (μ) | 50 | 45 | 55 | 45 | 55 | 50 | 50 | 60 | 60 | 150 | 50 | 150 | 50 | 50 | 150 | 140 |
| Resistance to gasoline | 2H | 2H | H | 2H | 2H | H | H | 2H | <6B | 2H | 4B | F | F | <6B | 4B | <6B |
| Resistance to moisture | A 100 | A 100 | A 100 | A 100 | A 100 | A 100 | A 100 | A 100 | C 75 | C 80 | C 70 | A 80 | A 80 | B 70 | A 80 | C 80 |
| Corrosion resistance (mm) | 1> | 1> | 2 | 1> | 1> | 1> | 1> | 1> | 2 | 8 | 2 | 10 | 1 | 3 | 7 | 2 |
| Weathering durability (%) | A 93 | A 92 | A 93 | A 93 | A 91 | A 93 | A 94 | A 86 | C 60 | B 90 | B 75 | A 90 | C 50 | A 90 | A 90 | C 70 |
| Heating durability | A | A | A | A | A | A | A | A | A | C | A | A | A | C | A | A |

| | Comparison Example | | | | | | | | | | |
|---|---|---|---|---|---|---|---|---|---|---|---|
| Properties | 17 | 18 | 19 | 20 | 21 | 22 | 23 | 24 | 25 | 26 | 27 |
| Anti-blocking property | A | A | A | A | C | A | A | A | A | A | A |
| Curability at low temperature | C | C | B | C | B | C | B | A | B | C | A |
| Erichsen test (mm) | 1> | 1 | 5 | 1 | 5< | 1 | 5 | 6 | 6 | 2 | 5 |
| Adhesion | 75 | 90 | 90 | 90 | 95 | 50 | 100 | 95 | 80 | 65 | 95 |
| Surface smoothness (μ) | 50 | 100 | 50 | 50 | 160 | 50 | 140 | 150 | 50 | 60 | 150 |
| Resistance to gasoline | <6B | <6B | 6B | 4B | 2B | 6B | 2H | 5B | 6B< | <6B | 4B |
| Resistance to moisture | C 30 | C 85 | A 85 | C 80 | B 50 | C 70 | C 80 | B 80 | C 50 | C 30 | A 80 |
| Corrosion resistance (mm) | 5 | 2 | 8 | 2 | 8 | 3 | 10 | 8 | 5 | 6 | 7 |
| Weathering durability (%) | C 50 | C 65 | C 60 | B 75 | A 80 | C 20 | C 85 | A 90 | B 70 | C 50 | A 90 |
| Heating | B | C | C | A | B | A | C | A | C | C | A |

TABLE 3-continued durability

Notes to Table 3
The test methods are as follows:
(1) Anti-blocking properties
The powder coating composition to be tested is placed into a cylindrical container, about 20 cm² in its bottom area, to a height of 20 cm, and then allowed to stand at 30° C. for 7 days. The composition is thereafter withdrawn from the container and checked for blocking with the unaided eye. The result is evaluated according to the following criteria:
A: No blocks whatever.
B: Some blocks of the size of rice grains found.
C: Wholly blocked to the shape of container.
(2) Curability at low temperatures
The composition to be tested is applied to a test piece to a thickness of 50 μ and baked at 160° C. for 20 minutes. The coating is then stroked 20 times by finger with a piece of gauze impregnated with toluene with application of a force of about 10 kg/cm². The coating is thereafter checked for changes with the unaided eye. The result is evaluated according to the following criteria:
A: No changes whatever.
B: Gloss disappeared from coating.
C: Coating turned glossless or dissolved with defacement with scratches.
(3) Erichsen test
With use of an Erichsen tester, a steel panel coated with the composition to be tested to a thickness of 50 μ (baked at 160° C. for 20 minutes) is pressed on the uncoated side with a punch having a rounded end about 1 inch in the diameter of curvature. The height (in mm) of the dent formed in the panel and needed to crack the coating is listed.
(4) Adhesion
The composition to be tested is applied to a steel panel to a thickness of 50 μ and then baked at 160° C. for 20 minutes. The coating is cut crosswise to the surface of the panel with a knife to form 100 squares, 1mm × 1mm. A piece of adhesive cellophane tape is applied to the coating and then quickly peeled off. The number of the squares remaining on the panel is listed.
(5) Surface smoothness
A panel is prepared which has a black background with 0.4-mm-wide white straight lines drawn thereon at the spacing of 0.4 mm. Another panel coated with the composition to be tested and the pattern-bearing panel are placed as opposed to each other, with the pattern-bearing surface facing the surface of the coating and positioned at an angle of 45 degrees with respect thereto. The coating surface is observed with the unaided eye to determine the thickness (in μ) of the coating which enables the coating to form thereon a sharp flawless image of the pattern. The coating is prepared by baking at 160° C. for 20 minutes.
(6) Resistance to gasoline
The composition to be tested is applied to a panel to a thickness of 50 μ and baked at 160° C. for 20 minutes. The coated panel is immersed in unleaded gasoline at 20° C. for 24 hours, thereafter withdrawn therefrom and allowed to stand for 1 hour. The coating is then checked for pencil hardness.
(7) Resistance to moisture
The composition to be tested in applied to a panel to a thickness of 50 μ and baked at 160° C. for 20 minutes. The coated panel is exposed to an atmosphere having a temperature of 50° C. and humidity of at least 95% for 72 hours. After drying indoors for 1 hour, the panel is checked for adhesion and changes in the surface of the coating. The state of the coating, which is listed on the left-hand side of the table, is evaluated according to the following criteria.
A: No changes whatever.
B: Slight blistering.
C: Marked blistering.
The result of adhesion test (conducted in the same manner as under (4) above) is given on the right-hand side of the table.
(8) Corrosion resistance
The composition to be tested is applied to a panel to a thickness of 50 μ and baked at 160° C. for 20 minutes. The coating is cut with a knife to the surface of the substrate cross hatch of the panel, and the coated panel is then tested for 200 hours according to JIS Z-2371. A piece of adhesive cellophane tape is thereafter applied to the cross-cut portion and then quickly peeled off. The width (in mm) of the coating separated from the substrate is measured at the cross-cut portion.
(9) Weathering durability
The composition to be tested is applied to a panel to a thickness of 50 μ and baked at 160° C. for 20 minutes. The coated panel is exposed to weather direct 5° south at Florida, U.S.A. for 2 years and thereafter checked for the gloss (60 deg specular reflectance) of the coating and color differences (L, a, b). The measurements are compared with the corresponding values determined before the exposure. The result is given in the table in which the gloss rention (%) is listed on the left-hand side and N.B.S. (ΔE) in color differences on the right-hand side. ΔE of below 0.3 is represented by A, that of 0.3 to 1.0 by B and that above 1.0 by C.
(10) Heating durability
Two coated panels having coating layer (50 μ thickness) are prepared by using the powder coating composition to be tested. One of them is cured by heating at 160° C. for 20 minutes and the other is cured by heating at 180° C. for 20 minutes. The color fanctions (L, a, b) of the resulting panels are measured by a color machine and the color difference between the two panels is determined. ΔE of up to 0.3 is represented by A, that of 0.3 to 1.0 by B and that above 1.0 by C.

I claim:
1. A thermosetting acrylic resin powder coating composition comprising:
(A) a mixture of 10 to 90% by weight of a glycidyl-containing acrylic resin comprising (i) 15 to 40% by weight of a glycidyl-containing vinyl monomer and/or methylglycidyl-containing vinyl monomer, (ii) 10 to 85% by weight of an acrylate and/or methacrylate and (iii) 0 to 50% by weight of other vinyl monomer, and 90 to 10% by weight of a hydroxyl-containing acrylic resin comprising (i) ' 5 to 40% by weight of a hydroxly-containing vinyl monomer, (ii) 10 to 95% by weight of an acrylate and/or methacrylate and (iii) 0 to 50% by weight of other vinyl monomer, or a glycidyl- and hydroxyl-containing acrylic resin comprising (i) 15 to 30% by weight of a glycidyl-containing vinyl monomer and/or methylclycidyl-containing vinyl monomer, (ii) 5 to 20% by weight of a hydroxyl-containing vinyl monomer, (iii) 10 to 80% by weight of an acrylate and/or methacrylate and (iv) 0 to 40% by weight of other vinyl monomer,
(B) a blocked isocyanate compound having a melting point of 60° to 140° C. and solid at room temperature,
(C) an aliphatic dibasic acid or anhydride thereof, and
(D) at least one tin compound represented by the formula $SnO_2$, $R_2SnO$, $R_2SnX_2$, $R_2Sn(OCOR')_2$,

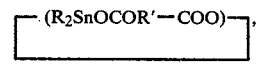

$R_3SnX$, $R_3Sn-O-SnR_3$

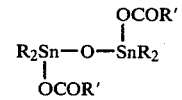

or $R_4Sn$ wherein R is phenyl or alkyl having 1 to 18 carbon atoms, X is halogen, alkoxyl having 1 to 18 carbon atoms or hydroxyl, R' is alkyl or alkenyl having 1 to 18 carbon atoms and n is an integer of 1 to 5,
each of the acrylic resins having a glass transition temperature of 50° to 90° C. and a weight average molecular weight of 5000 to 20000, wherein when said mixture is used as the component (A), the coating composition comprises 45 to 80% by weight of the mixture, 20 to 40% by weight of the blocked isocyanate compound (B), 3 to 20% by weight of the aliphatic dibasic acid or anhydride thereof (C) and 0.1 to 5% by weight of the tin compound (D), or when said glycidyl- and hydroxyl-containing acrylic resin is used as the component (A), the coating composition comprises 45 to 75% by weight of the acrylic resin, 22 to 40% by weight of the blocked isocyanate compound (B), 3 to 12% by weight of the aliphatic dibasic acid or anhydride thereof (C), and 0.4 to 4.0% by weight of the tin compound (D).

2. A powder coating composition as defined in claim 1 which comprises 50 to 70% by weight of the glycidyl- and hydroxyl-containing acrylic resin (A) as defined in claim 1, 25 to 35% by weight of the blocked isocyanate compound (B), 3 to 7% by weight of the aliphatic dibasic acid or anhydride thereof (C) and 0.5 to 3% by weight of the tin compound (D).

3. A powder coating composition as defined in claim 1 which comprises 50 to 75% by weight of the acrylic resin mixture (A), 22 to 38% by weight of the blocked isocyanate compound (B), 3 to 15% by weight of the dibasic acid or anhydride thereof (C) and 0.5 to 4.0% by weight of the compound (D).

4. A powder coating composition as defined in claim 1 wherein the acrylic resin mixture (A) comprises 20 to 80% by weight of a glycidyl-containing acrylic resin and 80 to 20% by weight of a hydroxyl-containing acrylic resin.

5. A powder coating composition as defined in claim 1 wherein the glycidyl- and hydroxyl-containing acrylic resin comprises 17 to 25% by weight of a glycidyl-containing vinyl monomer and/or methylglycidyl-containing vinyl monomer, 7 to 18% by weight of a hydroxyl-containing vinyl monomer, 20 to 76% by weight of an acrylate and/or methacrylate and 0 to 40% by weight of the other vinyl monomer.

6. A powder coating composition as defined in claim 1 wherein the glycidyl-containing acrylic resin comprises 20 to 35% by weight of a glydicyl-containing vinyl monomer and/or methylglycidyl-containing vinyl monomer, 35 to 80% by weight of an acrylate and/or methacrylate and up to 40% by weight of other vinyl monomer, and the hydroxyl-containing acrylic resin comprises 10 to 35% by weight of a hydroxyl-containing vinyl monomer, 40 to 90% by weight of an acrylate and/or methacrylate and 0–40% by weight of other vinyl monomer.

7. A powder coating composition as defined in claim 1 wherein each of the acrylic resins has a glass transition temperature of 50° to 85° C. and a weight average molecular weight of 8000 to 16000.

8. A powder coating composition as defined in claim 1 which further comprises an epoxy resin.

9. A powder coating composition as defined in claim 8 wherein the epoxy resin has at least two epoxy groups per molecule, an epoxy equivalent of up to 2500 and a number average molecular weight of up to 3000.

10. A powder coating composition as defined in claim 8 wherein the epoxy resin is contained in a ratio of up to 5 parts by weight per 100 parts by weight of the combined amount of the glycidyl- and hydroxyl-containing acrylic resin (A), the isocyanate compound (B), dibasic acid or anhydride thereof (C) and the tin compound (D).

11. A powder coating composition as defined in claim 8 wherein the epoxy resin is contained in a ratio of 0.3 to 4.0 parts by weight per 100 parts by weight of the combined amount of the glycidyl- and hydroxyl-containing acrylic resin (A), the isocyanate compound (B), dibasic acid or anhydride thereof (C) and the tin compound (D).

12. A powder coating composition as defined in claim 8 wherein the epoxy resin is contained in a ratio of up to 10 parts by weight per 100 parts by weight of the mixture (A) of a glycidyl-containing acrylic resin and a hydroxyl-containing acrylic resin, the isocyanate compound (B), dibasic acid or anhydride thereof (C) and the tin compound (D).

13. A powder coating composition as defined in claim 8 wherein the epoxy resin is contained in a ratio of 0.3 to 6.0 parts by weight per 100 parts by weight of the mixture (A) of a glycidyl-containing acrylic resin and a hydroxyl-containing acrylic resin, the isocyanate compound (B), the dibasic acid or anhydride thereof (C) and the compound (D).

14. A powder coating composition as defined in claim 1 which further contains at least one of a pigment, leveling agent and popping agent.

15. A powder coating composition as defined in claim 8 which further contains at least one of a pigment, leveling agent and popping agent.

* * * * *